(12) United States Patent
Park (10) Patent No.: US 11,959,524 B2
(45) Date of Patent: Apr. 16, 2024

(54) BRAKE LINING MONITORING SYSTEM (71) Applicant: Otis Elevator Company, Farmington, CT (US)

(72) Inventor: Chan-Jong Park, Vienna (AT)

(73) Assignee: OTIS GESELLSCHAFT M.B.H., Vienna (AT)

( * ) Notice: Subject to any disclaimer, the term of this patent is extended or adjusted under 35 U.S.C. 154(b) by 305 days.

(21) Appl. No.: 16/848,309

(22) Filed: Apr. 14, 2020

(65) Prior Publication Data

US 2020/0325949 A1   Oct. 15, 2020

(30) Foreign Application Priority Data

Apr. 15, 2019 (EP) ..................................... 19169335

(51) Int. Cl.
*F16D 66/02* (2006.01)
*B66B 5/18* (2006.01)
(Continued)

(52) U.S. Cl.
CPC ......... *F16D 66/025* (2013.01); *F16D 66/027* (2013.01); *F16D 66/028* (2013.01);
(Continued)

(58) Field of Classification Search
CPC .... F16D 66/024; F16D 66/025; F16D 66/026; F16D 66/00; F16D 2066/003; F16D 66/02; F16D 66/021; F16D 66/027; F16D 2066/006; F16D 66/028; F16D 66/023; F16D 65/0976; F16D 2300/18; F16D 2500/7101; B66B 5/0006; B66B 5/18
See application file for complete search history.

(56) References Cited

U.S. PATENT DOCUMENTS 3,398,246 A * 8/1968 Linet ...................... H01H 35/00
200/61.4
3,975,706 A * 8/1976 Kato ....................... F16D 66/00
200/61.4
(Continued)

FOREIGN PATENT DOCUMENTS

CN    106641031 A  *  5/2017  ............. F16D 65/02
CN    104813060 B  *  2/2018  ............. B60T 17/22
(Continued)

OTHER PUBLICATIONS

WO 2019/145244 A1 (Year: 2019).*
(Continued)

*Primary Examiner* — Robert A. Siconolfi
*Assistant Examiner* — Mahbubur Rashid
(74) *Attorney, Agent, or Firm* — CANTOR COLBURN LLP (57) ABSTRACT

A brake (200) comprising a braking surface (202); a brake lever (206) arranged to move between a retracted position and an engaged position; a brake lining (210) and at least one non-contact sensor (212). The brake lining is disposed between the braking surface and the brake lever such that when the brake lever is in the engaged position the brake lining is in contact with the braking surface. The at least one non-contact sensor is arranged to output a signal dependent on the distance between the non-contact sensor and the braking surface.

11 Claims, 6 Drawing Sheets

(51) Int. Cl.
   *B66B 25/00* (2006.01)
   *F16D 49/00* (2006.01)
   *F16D 63/00* (2006.01)
   *F16D 66/00* (2006.01)
   *F16D 125/64* (2012.01)

(52) U.S. Cl.
   CPC .............. *B66B 5/18* (2013.01); *B66B 25/006* (2013.01); *F16D 49/00* (2013.01); *F16D 63/008* (2013.01); *F16D 2066/006* (2013.01); *F16D 2125/64* (2013.01)

(56) References Cited

U.S. PATENT DOCUMENTS

| | | | | |
|---|---|---|---|---|
| 4,183,012 A * | 1/1980 | Kimura | ................ | F16D 66/024 200/61.4 |
| 4,274,511 A * | 6/1981 | Moriya | ................ | F16B 21/073 188/1.11 L |
| 4,298,857 A * | 11/1981 | Robins | ................ | F16D 66/024 200/61.4 |
| 4,685,540 A * | 8/1987 | Rath | ................ | F16D 66/024 340/454 |
| 4,742,326 A * | 5/1988 | Gregoire | ............... | F16D 66/024 188/1.11 R |
| 4,850,454 A * | 7/1989 | Korody | ................ | F16D 66/023 188/1.11 L |
| 5,151,681 A * | 9/1992 | Valmir | ................ | F16D 66/024 188/1.11 R |
| 5,372,221 A * | 12/1994 | Jalbert | ................ | B60T 17/22 303/122.08 |
| 5,419,415 A * | 5/1995 | Lamb | ................ | F16D 66/024 200/61.4 |
| 5,662,191 A * | 9/1997 | Le Deit | ............... | F16D 65/0976 188/1.11 L |
| 5,791,442 A * | 8/1998 | Arnold | ................ | H01F 5/00 188/164 |
| 6,095,289 A * | 8/2000 | Ray | ................ | F16D 66/00 188/1.11 R |
| 6,257,374 B1 * | 7/2001 | Strzelczyk | ............ | B60T 17/221 188/1.11 E |
| 6,302,241 B1 * | 10/2001 | Gronowicz, Jr. | ..... | B60T 17/221 188/1.11 W |
| 6,696,937 B1 * | 2/2004 | Kiefer | ................ | B60T 8/885 340/453 |
| 7,165,657 B2 * | 1/2007 | Palladino | .............. | F16D 66/026 188/1.11 E |
| 8,011,481 B2 * | 9/2011 | Erny | ................ | F16D 66/025 188/1.11 E |
| 8,047,336 B2 * | 11/2011 | Niehorster | .............. | F16D 65/54 188/71.9 |
| 8,177,308 B2 * | 5/2012 | Ralea | ................ | B60T 8/00 188/71.8 |
| 8,729,938 B2 * | 5/2014 | Watanabe | ................ | H03L 3/00 327/156 |
| 8,827,046 B2 * | 9/2014 | Cahill | ................ | F16D 66/026 188/1.11 L |
| 10,023,428 B2 * | 7/2018 | May | ................ | B66B 5/0031 |
| 10,479,646 B2 * | 11/2019 | Vakkamäki | ........ | H03K 17/9502 |
| 2004/0069573 A1 * | 4/2004 | Anderson | ............ | F16D 66/027 340/454 |
| 2005/0092556 A1 * | 5/2005 | Schoppa | ............... | B66B 5/0037 188/1.11 R |
| 2007/0131491 A1 * | 6/2007 | Cory | ................ | F16D 66/024 188/1.11 L |
| 2009/0229926 A1 * | 9/2009 | Schaefer | ............... | F16D 66/025 701/70 |
| 2013/0192933 A1 * | 8/2013 | King | ................ | F16D 66/027 188/1.11 L |
| 2013/0255366 A1 * | 10/2013 | Seglo | ................ | G05G 1/04 74/519 |
| 2013/0306410 A1 * | 11/2013 | Stumpf | ................ | F16D 66/024 188/1.11 L |
| 2014/0245824 A1 * | 9/2014 | Bosis | ................ | B60T 17/18 73/129 |
| 2015/0152931 A1 * | 6/2015 | Moore | ................ | G05G 1/04 74/519 |
| 2016/0137455 A1 * | 5/2016 | May | ................ | F16D 66/025 188/1.11 E |
| 2017/0038000 A1 * | 2/2017 | Füchsle | ................ | F16D 66/025 |
| 2017/0313549 A1 * | 11/2017 | Vakkamäki | ............... | B66B 1/32 |
| 2018/0282122 A1 * | 10/2018 | Sudi | ................ | B66B 5/0031 |
| 2019/0107163 A1 | 4/2019 | Medinei et al. | | |
| 2019/0120313 A1 * | 4/2019 | Heeder | ............... | F16D 65/0062 |
| 2019/0242450 A1 * | 8/2019 | Lin | ................ | F16D 66/024 |
| 2019/0264765 A1 * | 8/2019 | Juzswik | ................ | G01B 5/0028 |

FOREIGN PATENT DOCUMENTS

| | | | | |
|---|---|---|---|---|
| CN | 108871173 A | * | 11/2018 | .............. G01B 7/08 |
| CN | 109179138 A | | 1/2019 | |
| DE | 102012012830 A1 | | 1/2014 | |
| WO | 0020320 A1 | | 4/2000 | |
| WO | 2018197318 A1 | | 11/2018 | |

OTHER PUBLICATIONS

JP 4598525 B2 (Year: 2010).*
CN-110173527 A (Year: 2019).*
WO-2019101360 A1 (Year: 2019).*
CN 101624157 B (Year: 2012).*
DE 112012000585 T5 (Year: 2014).*
KR 101623519 B1 (Year: 2016).*
European Search for application EP 19169335.7, dated Nov. 15, 2019, 47 pages.
Communication Pursuant to Article 94(3) EPC for Application No. 19169335.7 dated Sep. 27, 2022.

* cited by examiner

Fig. 6

US 11,959,524 B2

BRAKE LINING MONITORING SYSTEM

FOREIGN PRIORITY

This application claims priority to European Patent Application No. 19169335.7 filed Apr. 15, 2019, and all the benefits accruing therefrom under 35 U.S.C. § 119, the contents of which in its entirety are herein incorporated by reference.

TECHNICAL FIELD

This disclosure relates to a brake lining monitoring system, for use in people conveyors such as escalator, moving walkway and/or elevator systems.

BACKGROUND

In escalator, moving walkway and elevator systems, a braking mechanism is an important feature. In some arrangements, braking is achieved using a brake drum and brake lever. In order to slow and/or stop the escalator, moving walkway or elevator, the brake lever is moved so as to bring a brake lining into contact with the brake drum. This action slows and/or stops the rotation of the brake drum which in turn may be attached or connected to a component of the drive train of the system. The brake lining is provided between the brake lever and the brake drum in order to increase the friction of the braking action, leading to more effective braking as well as being a replaceable component that can readily be replaced when it becomes worn down during use. In other braking arrangements, a brake lever may be used to press the brake lining against a braking surface on a rail instead of a drum. For example, such systems are used in elevator safety brakes.

Over time, the brake lining will wear down due to the friction between the brake lining and the brake drum or rail. If the brake lining becomes too worn (i.e. its thickness reduces too much) then the brake may become less effective. Thus, to maintain an effective braking system, it is necessary to replace the brake lining before it becomes worn out to such a degree.

In previous systems, in order to detect when the brake lining has been reduced to a certain thickness, electrical contactors have been embedded in the brake lining and used as part of a brake lining monitoring system. Such systems typically use the contactors as part of an electrical circuit which will only be completed when the contactors are exposed. As the contactors are initially embedded within the brake lining, they will only be exposed when the brake lining has become worn to the extent that the contactors are no longer embedded. Therefore when the electrical circuit is made, it can be determined that the brake lining has worn out to a state where replacement is necessary. In some such examples two electrical contactors are embedded in the brake lining. Before the brake lining has been worn out, the brake lining provides sufficient electrical insulation between the two contactors such that there is no electrical path between the two contactors. When the brake lining becomes worn out, the contactors both come into contact with the brake drum. As the brake drum is conductive, it provides an electrical path between the contactors, thus completing the electrical circuit. An alert may then be sent to an engineer that the brake lining needs replacing.

SUMMARY

According to a first aspect of this disclosure, there is provided a brake comprising: a braking surface; a brake lever arranged to move between a retracted position and an engaged position; a brake lining disposed between the braking surface and the brake lever such that when the brake lever is in the engaged position the brake lining is in contact with the braking surface; and at least one non-contact sensor; wherein the at least one non-contact sensor is arranged to output a signal dependent on the distance between the non-contact sensor and the braking surface.

The use of a non-contact sensor to monitor the state of the brake lining is advantageous as it allows the state of the brake lining to be monitored over time (e.g. throughout its whole service life), including providing information on the state of the brake before it is worn out as well as being able to detect an unsafe state which requires replacement. This allows for information and alerts relating to the status of the brake lining to be provided to engineers and/or operators earlier in the lifetime of the brake lining. This information can be used to schedule maintenance (e.g. replacement of the brake lining) to more accurately correspond to the time when the brake lining reaches the recommended replacement level. This helps to minimize the potential downtime (e.g. of the elevator, moving walkway or escalator) that may result between a brake lining reaching a minimum level and the technician reaching the site to replace it. In fact, with effective scheduling, down time may be minimized to just the time taken for the maintenance itself. An alternative to having system down time when the brake lining wears out is to schedule replacement early, before there is any significant risk of down time. However, this results in under use of the brake lining The additional wear information that can be obtained by monitoring the state of the brake lining with a non-contact sensor allows maintenance to be scheduled in advance of failure with a smaller margin of error, thus making more efficient use of the brake lining.

The non-contact sensor is also more robust and durable than an electrical conductor which can be damaged by mechanical contact with the brake drum. Such embedded contactors may need to be replaced regularly, or indeed with every replacement of the brake lining, whereas a non-contact sensor can be re-used after the brake lining has been replaced. Additionally, when the embedded contactors of non-contactless sensors are exposed, the contactors can scratch and damage the braking surface during the braking action. Such damage to the braking surface can adversely affect braking performance and may eventually necessitate repair or replacement of the component that forms the braking surface. By contrast, the non-contact sensor does not damage the braking surface.

In a set of examples the at least one non-contact sensor comprises a magnetic sensor. A magnetic sensor can be used to detect the strength of a magnetic field between the sensor and the braking surface, which in turn depends on the distance between the sensor and the braking surface. Using a magnetic sensor is particularly advantageous in configurations in which the braking surface is made of a ferromagnetic material such as steel. In another set of examples the at least one non-contact sensor comprises a capacitance sensor. A capacitance sensor detects the capacitance between the sensor and the braking surface, which in turn depends on the distance between the sensor and the braking surface (and the material of the intervening medium). A capacitance sensor does not require a ferromagnetic braking surface, but only an electrically conductive braking surface.

The at least one non-contact sensor may be mounted in or on the brake lever. It is envisaged that the sensor could be positioned on the brake lever, e.g. on one side thereof, in a position where the brake lining is not necessarily between the sensor and the braking surface. As the non-contact sensor only needs to sense the distance between the brake lever and the braking surface, it is not necessary for the brake lining to be disposed in between and thus the sensor can be mounted elsewhere on the brake lever so long as it senses a distance that varies in predictable relationship with the thickness of the brake lining In other examples the at least one non-contact sensor may be located inside the brake lever. This arrangement is more similar to the positioning of the sensor in previous designs in which the electrical contactors are fitted into the brake lining through a port in the brake lever. The non-contact sensor may be installed in a similar port, or indeed in the same port through which an electrical contactor was previously installed. This removes the necessity to replace the whole brake lever and instead allows the new sensor to be retrofitted easily into existing brake systems by simply replacing the electrical contactor with the new non-contact sensor. Thus in some examples the at least one non-contact sensor may be positioned in the brake lever such that the brake lining is disposed between the sensor and the braking surface.

It will be appreciated that a single non-contact sensor will suffice in many examples. However, in other examples the brake may comprise a plurality of non-contact sensors. The plurality of sensors may be used simply for redundancy, or may be positioned so as to assess different parts of the brake lining and thereby provide more information regarding variations in the thickness of the brake lining. A subset of the plurality of non-contact sensors may be located inside the brake lever. In addition, or alternatively, a subset of the plurality of non-contact sensors may be mounted on the side of the brake lever, e.g. without the brake lining interposed between the sensor and the braking surface.

The retracted position of the brake lever preferably corresponds to the brake lever being disengaged from the braking surface. Therefore, when the brake lever is in the engaged position, the signal output from the non-contact sensor is dependent on the thickness of the brake lining disposed between the brake lever and the braking surface. In certain examples, the brake lever may further comprise an actuator. The actuator is arranged to move the brake lever between the retracted position and the engaged position. The actuator may of course also be arranged to move the brake lever between the engaged position and the retracted position.

The braking surface may take any suitable form, depending on the system in which the brake is to be installed. In some examples, the braking surface may be a brake drum. Such examples may apply to escalators, moving walkways or elevators, e.g. in which a rotary component of the drive train is provided with a brake drum so as to be able to brake that component (e.g. a drive sheave). In other examples, the braking surface may be a rail. Such examples may apply to elevator systems, e.g. for braking an elevator car against a car guide rail or for braking a counterweight against a counterweight guide rail. In other examples, the braking surface may be a brake disc.

The brake may further comprise a controller. The controller is preferably configured to receive the output signal from the non-contact sensor. The controller may also process the output signal from the non-contact sensor. The controller may further be configured to take some action based on that processing. For example it may provide an alert to, for example, a central computer system based on the output of the non-contact sensor. It will be appreciated that any suitable form of controller may be used. Preferably the controller comprises a microprocessor. Preferably the controller comprises a memory suitable for storing sensor data and/or instructions for executing processing of sensor data.

The controller may process the output signal from the non-contact sensor in relation to the time at which the signal is received. The controller preferably obtains multiple data points by taking a plurality of measurements from the non-contact sensor. The controller may be arranged to predict a replacement time for the brake lining based on a plurality of measurements of the signal from the at least one non-contact sensor. Thus the controller can predict or extrapolate the changing thickness of the brake lining and thus the projected time of failure and/or projected time of desired replacement of the brake lining. In some examples the controller may be arranged to generate a mathematical regression model from a plurality of measurements of the signal from the at least one non-contact sensor and to use said model to predict a replacement time for the brake lining. This enables the controller to predict more precisely when the brake lining should be replaced. The memory of the controller may also acquire and store data on the individual usage patterns of the brake systems for different systems (e.g. different elevators, moving walkways and/or escalators). This can further enable the lifetime of the brake lining to be predicted more accurately.

In many examples the change of thickness of the brake lining may be expected to vary substantially linearly with time. Therefore it may be sufficient for the regression model to be a linear regression model. In reality, there is a slight non-linearity to the variation of thickness with time and therefore in some preferred examples the regression model may be a non-linear regression model. A second order (quadratic) regression model may thus be preferred in some cases. Higher orders of regression model may also be used if required, depending on the measured data.

The controller may determine from the output signal of the non-contact sensor the health of the brake lining by comparing the thickness of the brake lining to a threshold value. This threshold value may be predetermined and may correlate to a thickness at which the brake lining is almost worn out. The threshold value may be a predetermined thickness, e.g. indicating a remaining thickness of less than 5 mm, less than 4 mm, less than 3 mm, etc. Alternatively, the threshold may correspond to a remaining thickness which is e.g. less than 30%, less than 20% or less than 10% of the original thickness of the brake lining The controller may output a signal (e.g. an notification or alert) when the thickness of the brake lining is below the threshold value. The controller may provide an alert to a central computer system (or to a remote computer system such as at a maintenance company) to indicate that the brake lining needs to be replaced imminently. The controller may of course employ other (or multiple) thresholds to provide for example indications that the brake lining has reached or is approaching a dangerous level that requires the system to be taken out of service, or to provide early warnings of certain brake lining states such as an indication that the brake lining is half way to needing replacement.

It will be appreciated that the controller may also use the acquired data on brake lining thickness to determine a rate of change of brake lining thickness (or other derivative values such as an acceleration of brake lining thickness). Such data can be used to indicate changes in the usage pattern of the brake with time and can also be used to determine if the maintenance or replacement schedule needs to be adjusted according to the changing usage.

The controller may obtain measurements (i.e. readings) from the non-contact sensor periodically (e.g. at regular time intervals) or it may receive a continuous signal that can be continuously processed. Where measurements are obtained continuously or periodically, the data will contain data from both states of the brake, i.e. the engaged position and the retracted position (and possibly intermediate positions between the two). When the brake lever is in the retracted position and the sensor is mounted on the brake lever, the sensor output will represent a distance that includes the thickness of the brake lining and an additional gap, and is therefore not representative of the thickness of the brake lining alone. With continuous data, or with enough readings from periodically obtained data (e.g. providing the sampling rate is high enough), this data can be processed to extract the minimum distance which will be representative of the thickness of the brake lining. However, such additional processing is onerous as the periodic sampling must be sufficiently fast to ensure that short actuations of the brake are not missed.

In preferred examples therefore, the controller may be arranged to take each of the plurality of measurements at a time when the brake lining is in contact with the braking surface. Therefore it is preferred that the brake is arranged to generate a second signal when the brake lever is in the engaged position and the controller may then be arranged to take each of the plurality of measurements when said second signal indicates that the brake lever is in the engaged position. Any suitable sensor may be used to detect when the brake is in the engaged position. In many cases the brake is actuated into the engaged position upon receipt of some suitable signal (e.g. a brake command from another part of the system) and therefore this signal may simply be provided to the controller so that it can be used to ensure that data is acquired from the non-contact sensor during the braking operation, i.e. when the brake lining is in contact with both the brake drum and the brake lever. For example the controller may receive an input from a brake actuator. The controller may therefore only process signals from the non-contact sensor when the brake lever is in the engaged position. Therefore, signals are only processed when they are dependent only on the thickness of the brake lining. It will be appreciated that the braking signal may in some examples include the absence of a signal. For example in the case of safety brakes, these may be arranged to engage when power is lost, i.e. they require power to hold the brake in a retracted (disengaged) position. The loss of power may be considered a signal indicative of brake engagement and could trigger the acquisition of data from the non-contact sensor.

The brake may be employed in a passenger conveyor system such as an escalator, moving walkway or elevator system.

According to a second aspect of this disclosure there is provided a method for monitoring a brake lining comprising: obtaining a signal from a non-contact sensor disposed on one side of the brake lining, the signal dependent on the distance between the non-contact sensor and a braking surface disposed on the other side of the brake lining; and determining the state of the brake lining based on said signal.

It will be appreciated that all of the preferred and optional features discussed above in relation to the brake apply equally to the method of monitoring a brake lining In particular, the signal from the non-contact sensor may be obtained when the brake lining is in contact with the braking surface (and in some preferred examples only when the brake lining is in contact with the braking surface). The method may further comprise determining whether a brake lever is in a retracted position or an engaged position. If it is determined that the brake lever is in the engaged position, the method may then responsively obtain a signal (or sample a signal) from the non-contact sensor. This is advantageous as it ensures that the measurement from the non-contact sensor is indicative of the thickness of the brake lining The state of the brake lining may be determined during an analysis step in which data from the non-contact sensor is analysed. This analysis may determine the thickness of the brake lining The thickness of the brake lining may then be compared to a threshold value. The threshold value may correlate to a thickness of a brake lining at which the brake lining is almost worn out.

The method may further comprise generating an alert. An alert may be generated as a result of the analysis of the signal indicating that the thickness of the brake lining is equal to or below the threshold value. The method may further comprise a brake lining replacement being scheduled as a result of the alert. Therefore the brake lining can be replaced before it is worn out, decreasing the system downtime and preventing damage to the brake components.

The method, in some examples, includes storing the determined state of a brake lining (e.g. a thickness of the brake lining) The method may further comprise the step of extrapolating from the state of the brake lining the time at which the brake lining will be worn out. Such extrapolation may be based on known or expected rates of change, but is preferably based on calculated or predicted rates of change based on a plurality of measurements from the non-contact sensor. This provides a lifetime prediction of the brake lining, and can further account for the individual usage patterns of the particular brake system in a particular installation. Additionally or alternatively, a predicted time for replacing the brake lining may be calculated. Optionally, a brake lining replacement may be scheduled as a result.

DRAWING DESCRIPTION

Certain preferred examples of the present disclosure will now be described by way of example only, with reference to the following diagrams in which.

DETAILED DESCRIPTION

Figure 1:
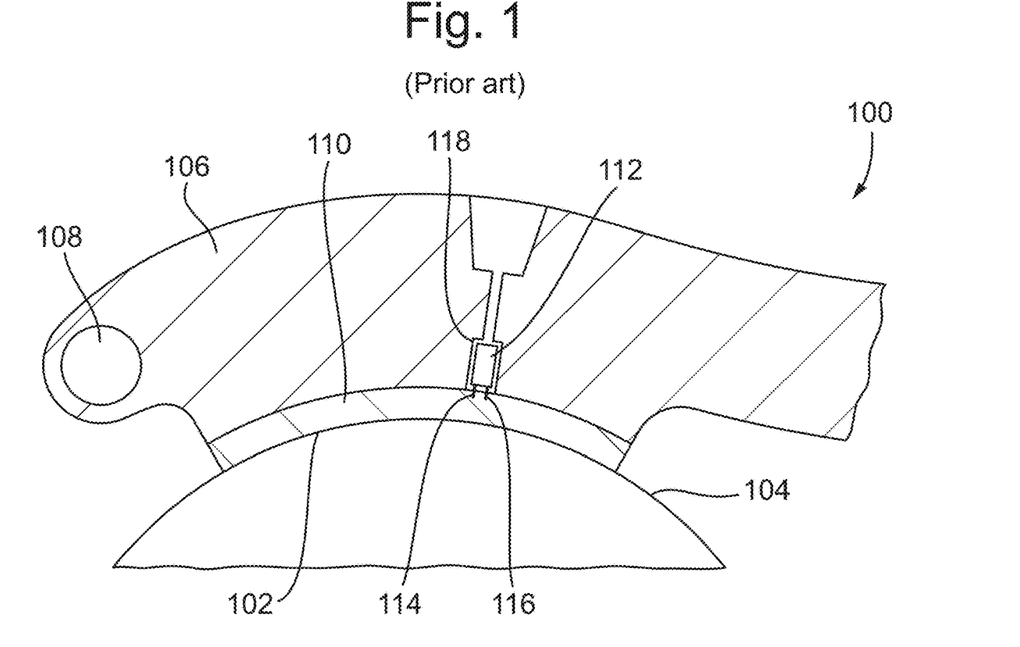
FIG. 1 is a schematic diagram of an embedded contact type brake configuration known from the prior art.

A brake 100, as known from the prior art, is seen in FIG. 1. The brake 100 comprises a braking surface 102, which, in this example, is a surface of a brake drum 104. The brake drum 104 in this example is made of a metal such as steel. The brake drum 104 may be part of a drive train of an escalator, moving walkway or elevator and may, in use, be driven (directly or indirectly) by a motor causing the brake drum 104 to rotate about its central axis. The brake 100 further comprises a brake lever 106. The brake lever 106 comprises a pivot 108 about which the brake lever 106 can be rotated.

In FIG. 1 the brake lever 106 has a brake lining 110 mounted on a surface that faces the braking surface 102 of the brake drum 104. Whilst in FIG. 1 the brake lining 110 is disposed on the brake lever 106, it will be appreciated that in other examples the brake lining could be disposed on the braking surface 102.

The brake lever 106 further comprises an electrical contactor 112, which is positioned within a port 118 in the brake lever 106. The electrical contactor 112 comprises first and second conductive prongs 114, 116. The conductive prongs 114, 116 insert into the brake lining 110 such that they are embedded therein. Before the brake lining 110 has been worn down, the brake lining 110 (which is made of a non-conductive material such as a fabric) electrically insulates the conductive prongs 114, 116 from one another. After some time and use, when the brake lining 110 has been worn down, the conductive prongs 114, 116 will be exposed and will come into contact with the braking surface 102 of the brake drum 104. The braking surface 102 provides an electrical pathway between the first and second prongs 114, 116. This triggers a signal to be output by the electrical contactor 112 indicating that the brake lining 110 has been worn out to such a degree that it should be replaced. The electrical contactor 112 may include a wireless transmitter for transmitting data to a controller, or it may be connected to a controller via wires which may be passed out through port 118.

Figure 2:
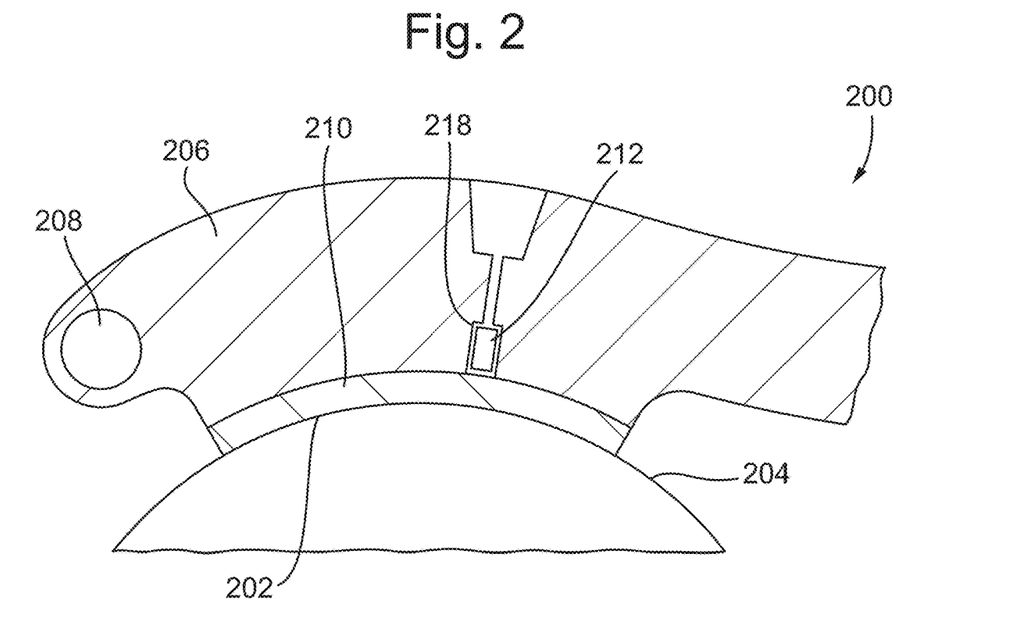
FIG. 2 is a schematic diagram of a brake configuration wherein a non-contact sensor is installed in the brake lever.

FIG. 2 depicts an example of a brake according to this disclosure. The brake 200 comprises a brake drum 204 and a brake lever 206. The brake drum 204 has a braking surface 202, and the brake lever 206 includes a pivot 208 and a brake lining 210, similar to the arrangement shown in FIG. 1. However in FIG. 2, a non-contact sensor 212 is inserted into port 218. The non-contact sensor 212 could be a magnetic sensor or a capacitance sensor.

When the non-contact sensor 212 is a magnetic sensor, it may be a Hall effect sensor in which the Hall effect is used to determine the magnetic field strength at the sensor 212. As this depends on the distance between the sensor 212 and the ferromagnetic braking surface 202, the sensor 212 can be used to measure the thickness of the brake lining 210. The output voltage from the magnetic sensor 212 will be inversely proportional to the distance between the magnetic sensor 212 and the brake drum 204, and therefore is indicative of the thickness of the brake lining 210. For example, the higher the voltage output from the magnetic sensor 212, the thinner the brake lining 210.

When the non-contact sensor 212 is a capacitance sensor, the sensor 212 forms one capacitor plate and the braking surface 202 forms the second capacitor plate. When this capacitor is charged (one plate is positively charged and the other is negatively charged), the capacitance measurement provided by the capacitance sensor 212 is inversely proportional to the separation of the two plates and thus measures the distance between the sensor 212 and the braking surface 202. Therefore, as the brake lining 210 wears thinner, the capacitance reading increases. It will be appreciated that the second capacitor plate could be a separate plate positioned underneath the brake lining 210 or rim of the brake drum 204. The brake lever 206 as a whole could potentially be used as one capacitor plate.

The non-contact sensor 212 in FIG. 2 is disposed inside the brake lever 206 in a port 218 which previously may have held an electrical contactor 112 (as in FIG. 1). Thus the non-contact sensor 212 may be retrofitted to existing brake levers 206, thereby avoiding the need to replace the brake lever 206. The non-contact sensor 212 need not be in contact with the brake lining 210, unlike the electrical contactor 112 seen in FIG. 1 which is embedded within (and therefore in contact with) the brake lining 110. The non-contact sensor 212 may be permanently installed in the brake lever 206, remaining in place even when the brake lining 210 is replaced.

Figure 3:
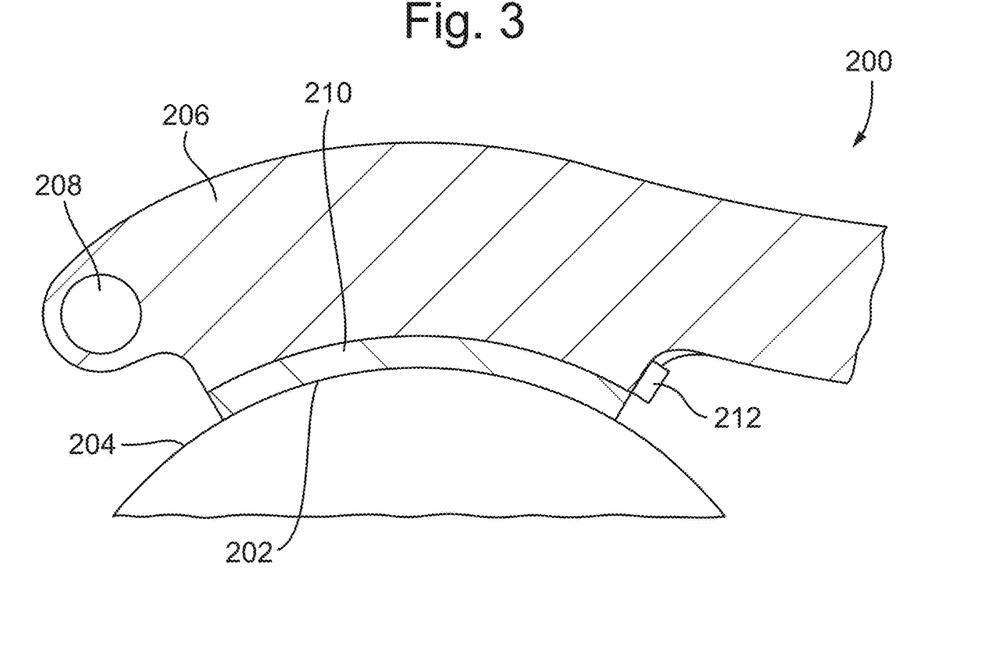
FIG. 3 is a schematic diagram of another disclosed exemplary brake configuration wherein the non-contact sensor is disposed adjacent to the brake lever.

The non-contact sensor 212 does not need to be installed within the brake lever 206. An alternative arrangement is shown in FIG. 3, in which the non-contact sensor 212 is positioned on a side surface of the brake lever 206, adjacent to the brake lining 210, but with the brake lining 210 not being disposed between the sensor 212 and the brake drum 204. As the relative position of the sensor 212 relative to the brake drum 204 is still dependent on the thickness of the brake lining 210 (which limits movement of the brake lever 206 with respect to the brake drum 204), the signal output from the non-contact sensor 212 is still dependent on, and indicative of, the thickness of the brake lining 210.

Similarly to the electrical contactor 112 of FIG. 1, the non-contact sensor 212 may be wireless or may be connected to external systems via wires running through the port 218 (or otherwise attached to the brake lever 206).

Figure 4:
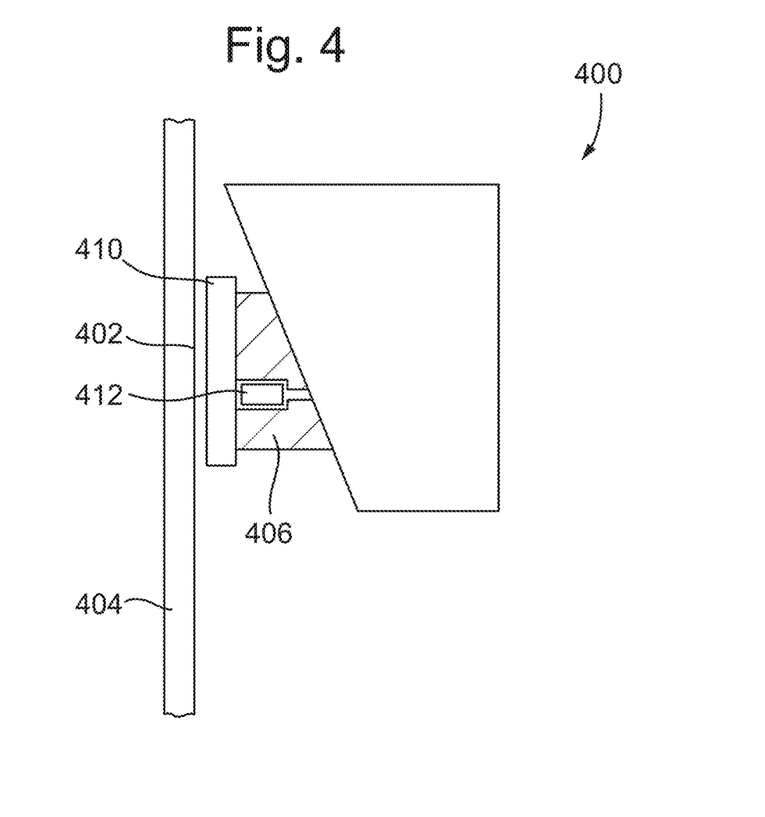
FIG. 4 is a schematic diagram of a further disclosed exemplary brake configuration where the braking surface is part of a brake rail.

FIG. 4 shows an alternative brake arrangement 400 in which the braking surface 402 is part of a rail 404 (e.g. an elevator guide rail for an elevator car or counterweight). In the arrangement shown in FIG. 4, the brake lining 410 is mounted on a brake lever 406. However, in some examples it is also possible for the brake lining 410 to be mounted on the rail 404. To operate the brake 400, an actuator connected to the brake lever 406 moves the brake lever 406 from a first retracted position, in which the brake lining 410 is not in contact with the brake rail 404, to a second engaged position, in which the brake lining 410 comes into contact with the brake rail 404. The friction between the brake lining 410 and the brake rail 404 will provide the braking force, which for example may bring an elevator car or counterweight to a stop and/or hold the elevator car or counterweight in a fixed position. In FIG. 4 the brake lever 406 is shown in the first retracted position. The non-contact sensor 412 is mounted within brake lever 406 and operates as discussed above in relation to brake drums. The sensor 412 may of course also be attached to the side of the brake lever 406, without the brake lining 410 being disposed between it and the guide rail 404, as discussed above.

Figure 5A:
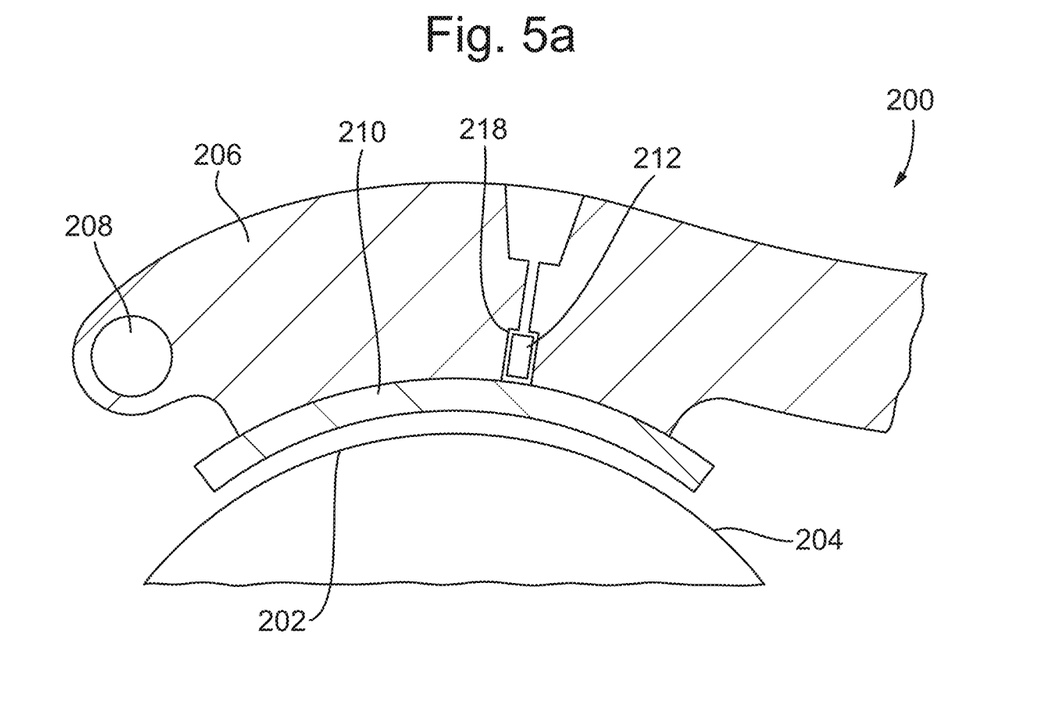
FIG. 5a is a schematic diagram of the brake lever in a first retracted position.

In FIG. 5a, the brake lever 206 is shown in a first retracted position. In the first retracted position, the brake lever 206 is positioned such that the brake lining 210 is not in contact with the brake drum 204. In this position the brake 200 is not engaged. The brake drum 204 remains free to rotate and therefore there is no braking action. In contrast in FIGS. 1-3 and 5b, the brake lever 106, 206 is in the second engaged position in which the brake lever 106, 206 is positioned such that the brake lining 110, 210 is in contact with the brake drum 104, 204. In this position the brake 100, 200 is activated, and the brake lever 106, 206 halts the rotation of the brake drum 104, 204.

Figure 5B:
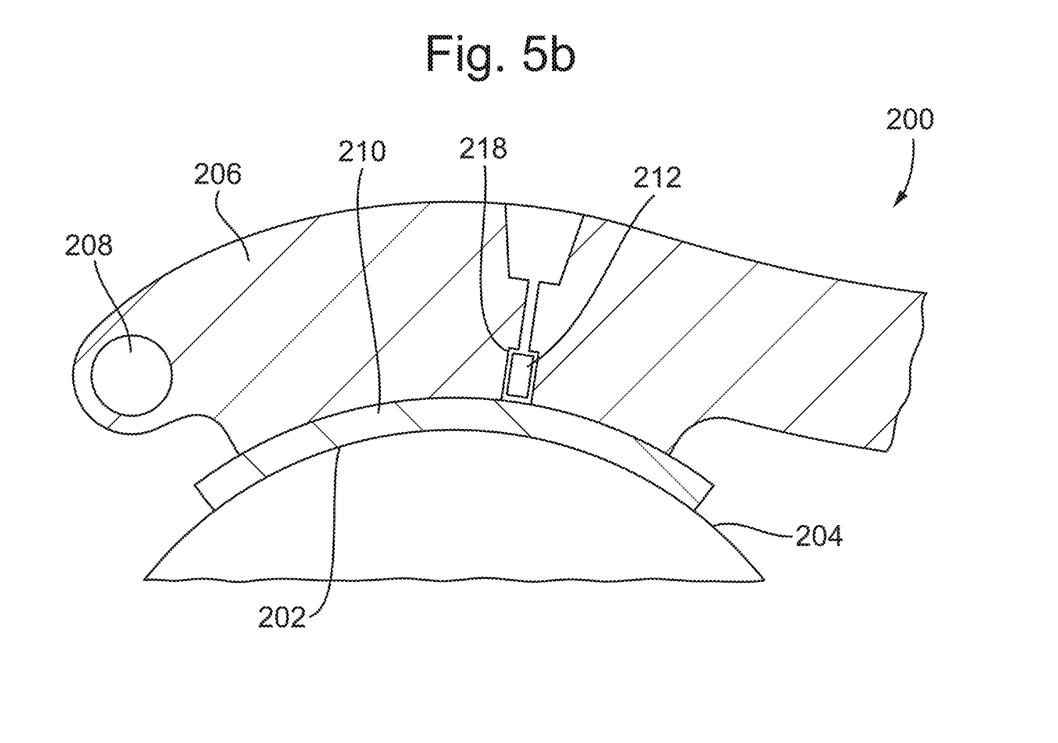
FIG. 5b is a schematic diagram of the brake lever in a second engaged position.

The brake lever 106, 206 is moved between the first retracted position and the second engaged position by an actuator (not shown). When the actuator is activated (e.g. by a controller), the actuator pivots the brake lever 106, 206 about the pivot 108, 208.

As can be seen from FIGS. 5a and 5b, when the brake 200 is in the retracted position, the distance between the sensor 212 and the brake drum 204 includes both the thickness of the brake lining 210 and the air gap between the brake lining 210 and the brake drum 204. This total distance will not change over time, even as the brake lining 210 wears down. Therefore to measure the thickness of the brake lining 210 it is necessary to acquire data from the sensor 212 when the brake is in the engaged position shown in FIG. 5b. If the sensor 212 is in line with the edge of the brake lever 206, i.e. at the boundary between the brake lever 206 and the brake lining 210, then in this engaged position the distance between the sensor 212 and the brake drum 204 is just the thickness of the brake lining 210 and this distance will change (reduce) over time as the brake lining 210 becomes worn. If the sensor 212 is not in line with the edge of the brake lever 206 (e.g. it is recessed back from the boundary between the brake lever 206 and the brake lining 210 as shown in FIG. 5b), then in the engaged positioned the distance between the sensor 212 and the brake drum 204 will also include the distance between the sensor 212 and the edge of the brake lever 206, e.g. it may be greater than the thickness of the brake lining 210. However, as the distance between the sensor 212 and the edge of the brake lever 206 does not change over time, any change in the distance between the sensor 212 and the brake drum 204 will still reflect the reduction in thickness of the brake lining 210.

Data from the sensor 212 may be monitored continuously, or at regular time intervals with a period shorter than a typical brake engagement so that the system can guarantee that data will be acquired during the period when the brake 200 is in the engaged position shown in FIG. 5b. The measurements that correspond to the thickness of the brake lining 210 can then be extracted by taking a "min" function of the data. However, to avoid such continuous measuring and analysing, it is preferred only to read data from the non-contact sensor 212 when the brake lever 206 is in the second engaged position. This may be achieved using either a braking command signal that initiates braking to also initiate data acquisition from the sensor 212, or by employing another sensor (not shown) that triggers data acquisition only when the brake 200 is moved to the engaged position.

Figure 6:
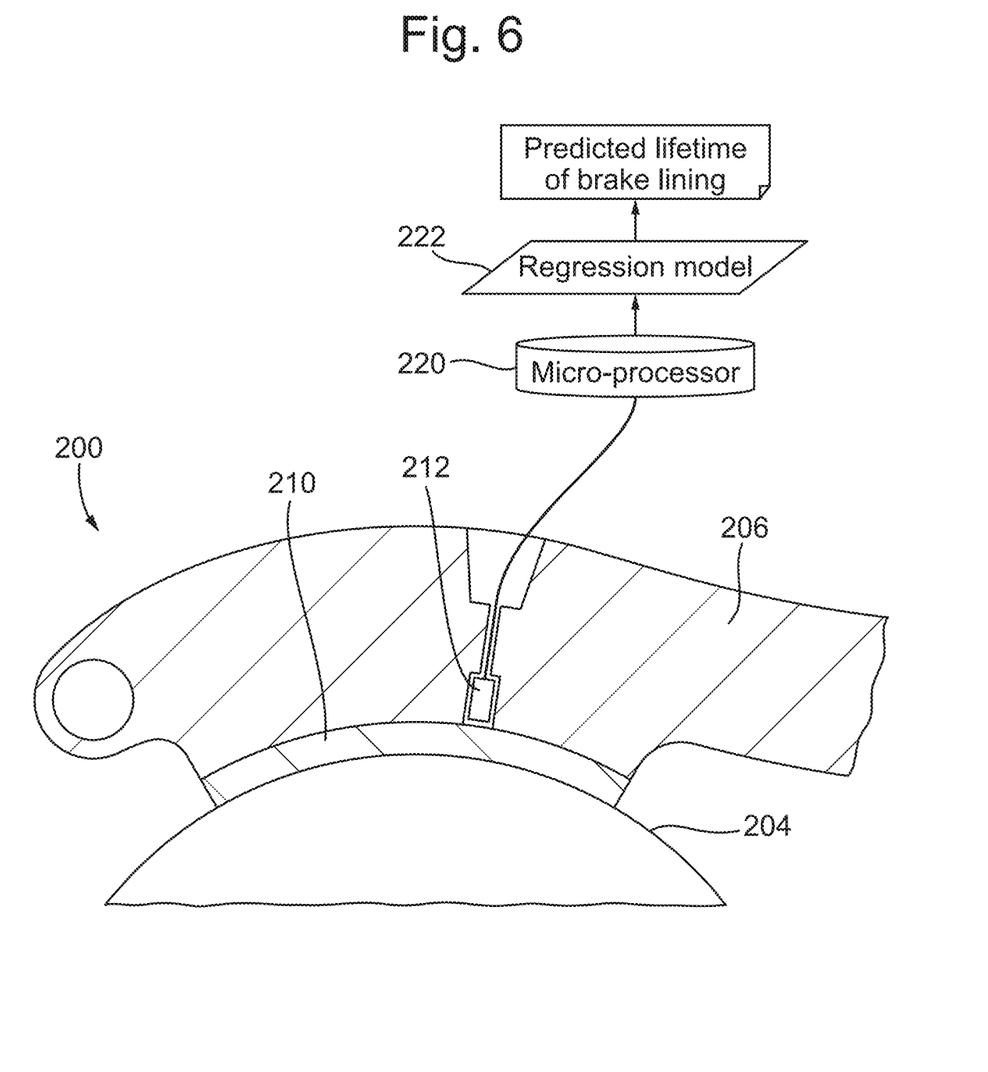
FIG. 6 schematically shows a controller and regression model associated with a brake.

FIG. 6 illustrates schematically how a non-contact sensor 212 of a brake 200 may be connected to a controller (microprocessor) 220 which includes a mathematical regression model 222 that analyses the detected brake lining thickness data over time and outputs a predicted lifetime of the brake lining 210.

Figure 7:
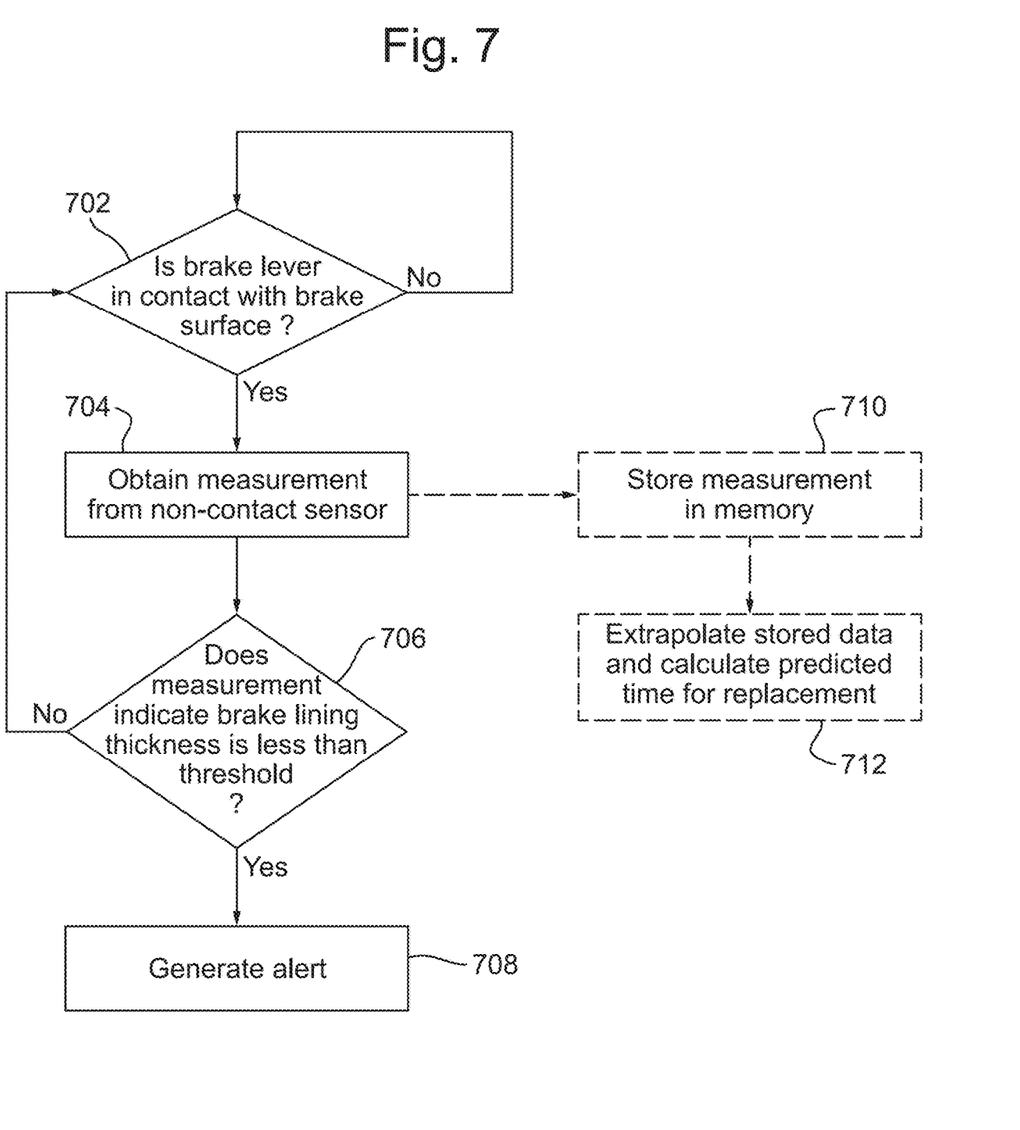
FIG. 7 is a flow chart demonstrating a method for processing the data output by the non-contact sensor.

FIG. 7 shows an exemplary process for analysing the signal output from a non-contact sensor 212. In step 702, it is determined whether the brake lever is in contact with the braking surface i.e. whether the brake lever is in the engaged position. If it is determined that the brake lever is in contact with the braking surface then in step 704 a measurement is obtained from the non-contact sensor. Otherwise, processing waits for contact, looping back to step 702.

In step 706, the controller determines whether the thickness of the brake lining determined from the output signal of the non-contact sensor is less than a predetermined threshold thickness. The predetermined threshold thickness may be a thickness at which the brake lining has been worn out to such an extent that immediate replacement is required. Alternatively, the predetermined threshold thickness may be a thickness indicative of a need to replace the brake lining soon, i.e. allowing a margin for error and starting a time period in which maintenance must be carried out. It will be appreciated that both of these thresholds could readily be implemented and both checked as part of this process.

If the thickness is determined to be equal to or less than the predetermined threshold thickness, in step 708 an alert is issued, e.g. to a central computer system. This alert may result in maintenance being scheduled to replace the brake lining. If the thickness is determined to be greater than the predetermined threshold thickness, no alert is issued and the process returns to step 702.

Steps 710 and 712 show an optional addition to this process and are therefore shown in dashed lines.

In step 710, the controller records the thickness of the brake lining in its memory. The controller can then use a mathematical regression model in step 712 to analyse the thickness measurements of the brake lining that have been acquired and stored over time. In step 712, the controller can extrapolate from the mathematical regression model a prediction of the time at which the brake lining needs to be replaced.

This mathematical regression model can also be used to extrapolate other times such as a time at which the brake lining will be worn to a dangerous level at which the system must be taken out of service and/or a time at which the brake lining would be completely worn out (zero thickness).

Figure 8:
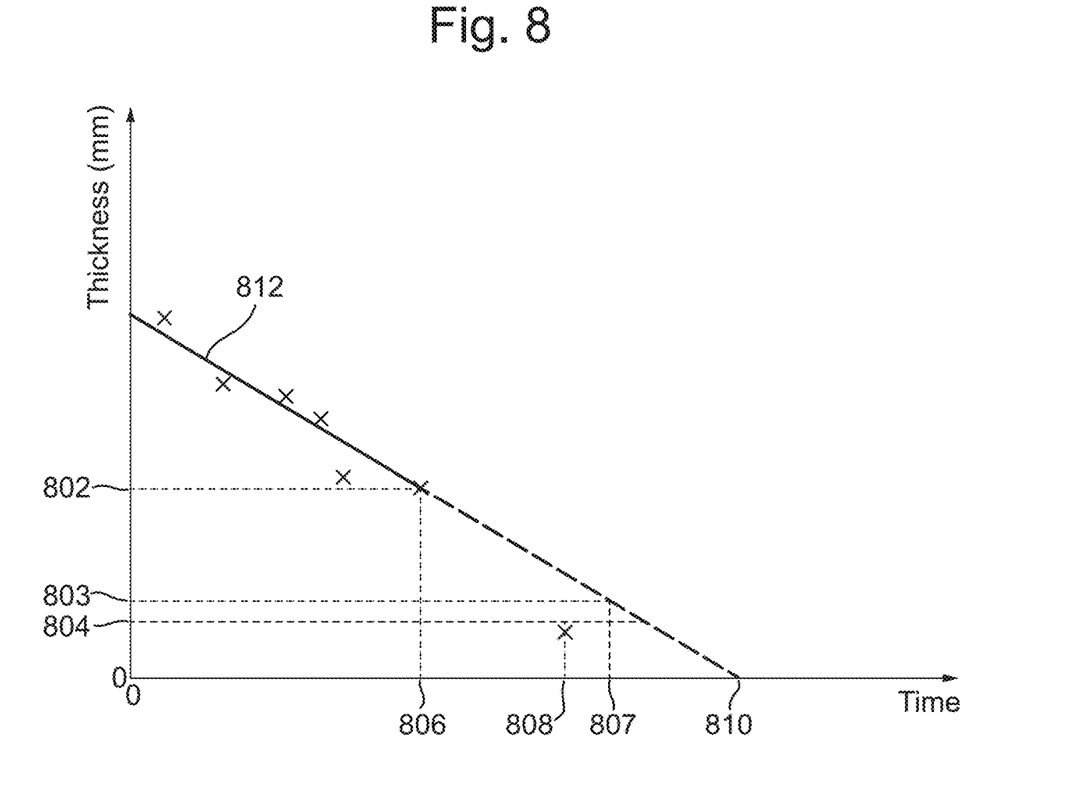
FIG. 8 is an example graph of the measured thickness of the brake lining over a period of time.

FIG. 8 shows an example of a mathematical regression model and extrapolation calculated by a controller. The data points plotted correspond to the measured thickness of the brake lining when the brake lever is in the engaged position. The trend shows a decrease in the thickness of the brake lining over time and a linear regression fit is provided. It will be appreciated that in some examples it may be more appropriate to fit the data using a non-linear fit, e.g. a quadratic or exponential fit.

Using the extrapolated data, the controller can predict the time 810 at which the brake lining will wear out completely (i.e. the time at which the thickness of the brake lining will be zero). An engineer can be scheduled to replace the brake lining sufficiently in advance of this time in order to ensure that there is no unnecessary downtime of the system due to the brake lining being worn out.

In FIG. 8 time 806 shows a current thickness of the brake lining (the thickness being indicated at 802). The linear regression fit is shown as the line 812 with the dashed portion indicating the extrapolation of the measurements received up to this point. Time 807 indicates a time at which maintenance is scheduled to replace the brake lining (this time 807 corresponding to the threshold thickness 803 at which brake lining replacement is to be effected). However, the wear of the brake lining may not be consistent and predicable over time. For example, the brake lining may be worn more quickly during a certain time period due to increased use of the brake. Of course subsequent measurements can still be taken into account and the maintenance schedule adjusted accordingly. However, it may be beneficial to define a predetermined threshold thickness 804, at which the controller can provide an emergency alert (e.g. to the central computer system) indicating that the brake lining must be replaced imminently (or immediately). Such an alert could also be used to initiate a shutdown of the system to avoid a dangerous situation. In FIG. 8, a subsequent measurement is shown at time 808 at which the thickness is below the extrapolated thickness and which is under the threshold thickness 804 indicating an emergency alert.

While the disclosure has been described in detail in connection with only a limited number of examples, it should be readily understood that the disclosure is not limited to such disclosed examples. Rather, the disclosure can be modified to incorporate any number of variations, alterations, substitutions or equivalent arrangements not heretofore described, but which are commensurate with the scope of the disclosure. Additionally, while various examples of the disclosure have been described, it is to be understood that aspects of the disclosure may include only some of the described examples. Accordingly, the disclosure is not to be seen as limited by the foregoing description, but is only limited by the scope of the appended claims.

What is claimed is:

1. A brake of one of an escalator, a moving walkway or an elevator system, the brake comprising:
    a braking surface;
    a brake lever arranged to move between a retracted position and an engaged position;
    a brake lining disposed between the braking surface and the brake lever such that when the brake lever is in the engaged position the brake lining is in contact with the braking surface; and
    at least one non-contact sensor;
    wherein the at least one non-contact sensor is a magnetic sensor arranged to detect the strength of a magnetic field between the sensor and the braking surface, and to output a signal dependent on the distance between the non-contact sensor and the braking surface; and
    a controller arranged to receive the signal from the at least one non-contact sensor and calculate a thickness of the brake lining from the received signal;
    wherein the controller is arranged to predict a replacement time for the brake lining based on a plurality of measurements of the signal from the at least one non-contact sensor.

2. The brake as claimed in claim 1, wherein the at least one non-contact sensor is embedded in the brake lever, with the brake lining disposed directly between the non-contact sensor and the braking surface.

3. The brake as claimed in claim 1, wherein the at least one non-contact sensor is positioned in the brake lever such that the brake lining is disposed between the non-contact sensor and the braking surface.

4. The brake as claimed in claim 1, wherein the braking surface is a brake drum or a brake rail.

5. The brake as claimed in claim 1, wherein the controller is arranged to output an alert based on the signal from the at least one non-contact sensor.

6. The brake as claimed in claim 1, wherein the controller is arranged to take each of the plurality of measurements at a time when the brake lining is in contact with the braking surface.

7. The brake as claimed in claim 1, wherein the brake is arranged to generate a second signal when the brake lever is in the engaged position and wherein the controller is arranged to take each of the plurality of measurements when said second signal indicates that the brake lever is in the engaged position.

8. A brake of one of an escalator, a moving walkway or an elevator system, the brake comprising:
    a braking surface;
    a brake lever arranged to move between a retracted position and an engaged position;
    a brake lining disposed between the braking surface and the brake lever such that when the brake lever is in the engaged position the brake lining is in contact with the braking surface; and
    at least one non-contact sensor;
    wherein the at least one non-contact sensor is a magnetic sensor arranged to detect the strength of a magnetic field between the sensor and the braking surface, and to output a signal dependent on the distance between the non-contact sensor and the braking surface; and
    a controller arranged to receive the signal from the at least one non-contact sensor and calculate a thickness of the brake lining from the received signal;
    wherein the controller is arranged to generate a mathematical regression model from a plurality of measurements of the signal from the at least one non-contact sensor and to use said model to predict a replacement time for the brake lining.

9. A method for monitoring a brake lining of one of an escalator, a moving walkway or an elevator system, the method comprising:
    obtaining a signal from a non-contact sensor disposed on one side of the brake lining, the signal dependent on the distance between the non-contact sensor and a braking surface disposed on the other side of the brake lining; and
    determining the state of the brake lining based on said signal; and
    calculating a thickness of the brake lining from the received signal;
    obtaining a plurality of measurements from the signal from the non-contact sensor; and
    predicting from said plurality of measurements a replacement time for the brake lining;
    wherein the non-contact sensor is a magnetic sensor arranged to detect the strength of a magnetic field between the sensor and the braking surface and outputs a signal dependent on the distance between the non-contact sensor and the braking surface.

10. The method as claimed in claim 9, wherein the signal from the non-contact sensor is obtained when the brake lining is in contact with the braking surface.

11. The method of claim 9, wherein the at least one non-contact sensor is embedded in the brake lever, with the brake lining disposed directly between the non-contact sensor and the braking surface.

* * * * *